United States Patent
Jiang et al.

(10) Patent No.: US 7,589,961 B2
(45) Date of Patent: Sep. 15, 2009

(54) PUSHING ASSEMBLY FOR DATA STORAGE DEVICE

(75) Inventors: Xiao-Gang Jiang, Shenzhen (CN);
Hung-Chun Lu, Tu-Cheng (TW);
Chien-Li Tsai, Tu-Cheng (TW);
Wen-Kang Lo, Tu-Cheng (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 394 days.

(21) Appl. No.: 11/472,978

(22) Filed: Jun. 21, 2006

(65) Prior Publication Data

US 2006/0291159 A1 Dec. 28, 2006

(30) Foreign Application Priority Data

Jun. 28, 2005 (CN) .................. 2005 2 0060822 U

(51) Int. Cl.
*H05K 7/12* (2006.01)
(52) U.S. Cl. .................. 361/679.38; 361/727; 292/296
(58) Field of Classification Search .............. 361/685, 361/679.38, 727; 292/296
See application file for complete search history.

(56) References Cited

U.S. PATENT DOCUMENTS

| 6,185,103 | B1 | 2/2001 | Yamada |
| 6,252,765 | B1 * | 6/2001 | Balzaretti et al. ............ 361/683 |
| 6,392,879 | B1 * | 5/2002 | Chien .......................... 361/685 |
| 6,606,241 | B2 * | 8/2003 | Moore .......................... 361/685 |
| 6,717,805 | B2 * | 4/2004 | Liu et al. ................ 361/679.32 |
| 7,009,836 | B2 | 3/2006 | Lo |

FOREIGN PATENT DOCUMENTS

TW M221956 10/2004

* cited by examiner

*Primary Examiner*—Jayprakash N Gandhi
*Assistant Examiner*—Ingrid Wright
(74) *Attorney, Agent, or Firm*—Zhigang Ma

(57) ABSTRACT

A pushing assembly is provided for pushing a data storage device out of a computer enclosure. The pushing assembly includes a pair of receiving portions, a restricting portion, a pushing device, and a stopping member. The receiving portions and the restricting portion are arranged in the computer enclosure. The pushing device is assembled on the data storage device. The pushing device comprises a pair of pushing portions. The pushing portions press against the receiving portions respectively to push the pushing device moving. The pushing device drives the data storage device to slide a certain distance to facilitate the data storage device being taken out from the computer enclosure. The stopping member is arranged in the restricting portion to keep the pushing device at a locked state.

19 Claims, 4 Drawing Sheets

PUSHING ASSEMBLY FOR DATA STORAGE DEVICE

BACKGROUND OF THE INVENTION

1. Field of the Invention

The present invention relates to pushing assembly for data storage devices, and particularly to a pushing assembly for readily pushing a data storage device out of a computer enclosure.

2. General Background

The production of notebook computer has become mature and entered a meager profit era. Only cost down and bringing convenience to users can bring more competitive strength. Typically, data storage devices, such as hard disk drives (HDDs), and compact disk-read only memory (CD-ROM) drives, are attached to a bottom panel of a notebook computer enclosure. A connector of a data storage device connects with a connector of a motherboard in the notebook computer to exchange data. However, because the interior space of the notebook computer enclosure is very limited, some elements besides the data storage device must be detached in order to achieve operation space for pulling out the connector of the data storage devices from the connector of the motherboard. The process of detaching a data storage device is very inconvenient.

What is needed is a pushing assembly for readily pushing a data storage device out of a computer enclosure.

SUMMARY

In one preferred embodiment, a pushing assembly is provided for pushing a data storage device out of a computer enclosure. The pushing assembly includes a pair of receiving portions, a restricting portion, a pushing device, and a stopping member. The receiving portions and the restricting portion are arranged in the computer enclosure. The pushing device is assembled on the data storage device. The pushing device comprises a pair of pushing portions. The pushing portions press against the receiving portions respectively to push the pushing device moving. The pushing device drives the data storage device to slide a certain distance to facilitate the data storage device being taken out from the computer enclosure. The stopping member is arranged in the restricting portion to keep the pushing device at a locked state.

Other advantages and novel features will become more apparent from the following detailed description when taken in conjunction with the accompanying drawings, in which:

DETAILED DESCRIPTION OF THE EMBODIMENTS

Figure 1:
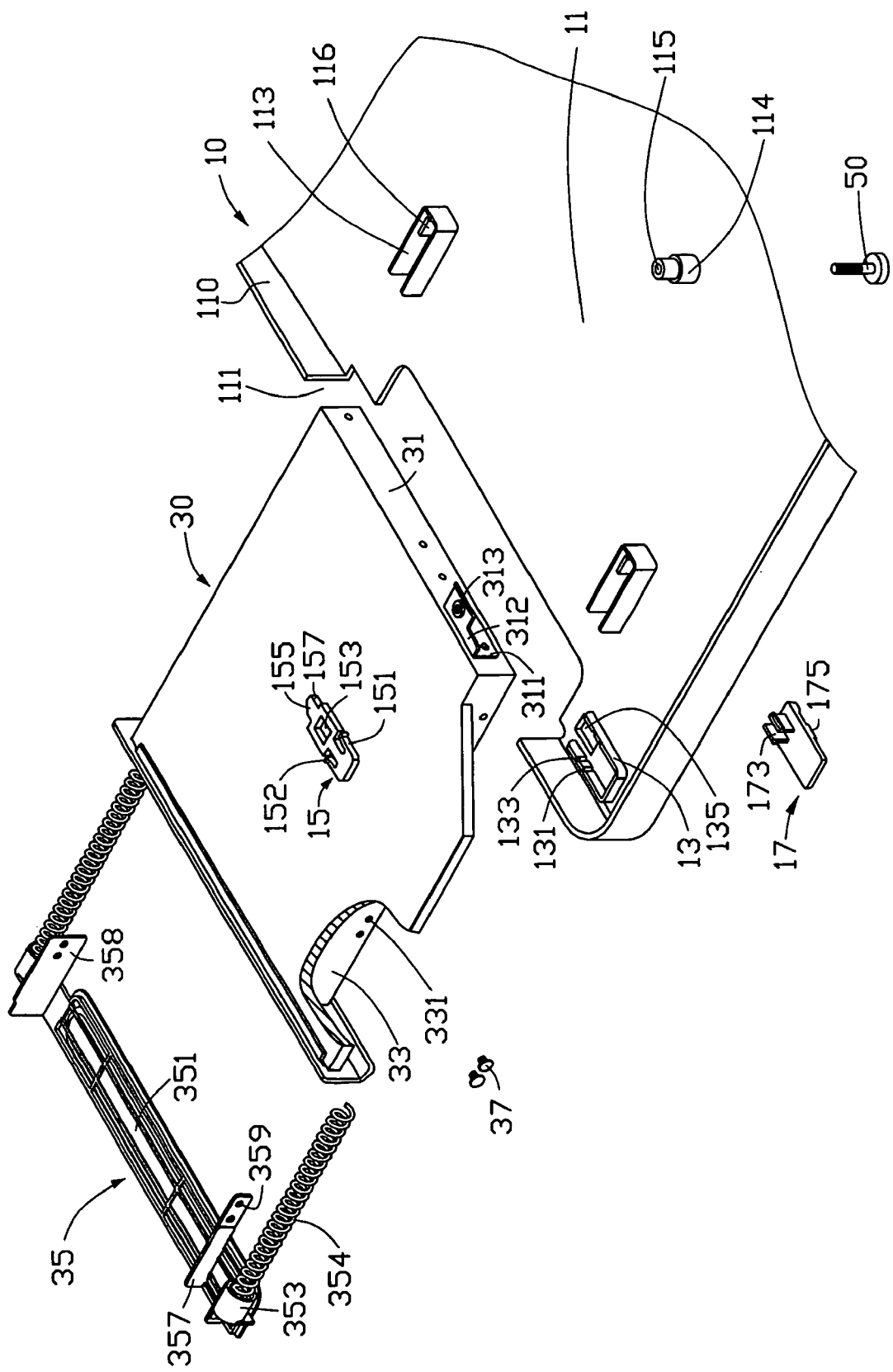
FIG. 1 is an exploded, isometric view of a pushing assembly in accordance with a preferred embodiment of the present invention, together with a data storage device, a mounting apparatus, and a notebook computer enclosure.

Referring to FIG. 1, a pushing assembly in accordance with a preferred embodiment of the present invention is provided to push an electronic component out of an enclosure 10 of an electronic device like a notebook computer. The electronic component is a data storage device 30 in this preferred embodiment. The notebook computer enclosure 10 includes a bottom panel 11 and a side panel 110. An opening 111 is defined in the side panel 110 for entry of the data storage device 30. A rear wall 31 of the data storage device 30 includes a connector.

The data storage device 30 is attached to the notebook computer enclosure 10 by a mounting apparatus. The mounting apparatus includes a positioning post 114, a fixing portion 311 and a screw 50. The positioning post 114 protrudes from the bottom panel 11, and a round hole 115 is defined in the positioning post 114. The fixing portion 311 is mounted to the rear wall 31 of the data storage device 30 by screws. The fixing portion 311 includes a tab 312 with a securing hole 313. The screw 50 extends through the round hole 115 of the positioning post 114 then engages in the securing hole 313 of the fixing portion 311, thus the data storage device 30 is attached to the notebook computer enclosure 10.

The pushing assembly includes a pair of receiving portions 113, a restricting portion 13, a stopping member 15, an operation portion 17, and a pushing device 35.

The receiving portions 113 are integrally formed on an inner surface of the bottom panel 11 of the notebook computer enclosure 10. In another embodiment, the receiving portions 113 may be formed alone and fixed to the inner surface of the bottom panel 11 via bolts. Each receiving portion 113 is U-shaped. A block 116 is formed on an inner bottom of each receiving portion 113.

The restricting portion 13 is integrally formed on the inner side of the bottom panel 11 of the notebook computer enclosure 10. In another embodiment, the restricting portion 13 may be formed alone and fixed to the inner surface of the bottom panel 11 via bolts. The restricting portion 13 is U-shaped. A pair of first cutouts 131 and a pair of second cutouts 133 are formed on inner flanges of the restricting portion 13. A sliding slot 135 is defined in the bottom panel 11 of the notebook computer enclosure 10.

The stopping member 15 includes a pair of fastening feet 151 extending from an end thereof. Each fastening foot 151 includes a latch 152 corresponding to the first cutout 131 and the second cutout 133 of the restricting portion 13. An aperture 153 is defined in the stopping member 15 corresponding to the sliding slot 135 of the restricting portion 13. A stopping block 155 protrudes outward from another end of the stopping member 15. A stopping block 155 includes a stopping plane 157.

The operation portion 17 includes a pair of clasps 173 and a manipulating section 175. The manipulating section 175 forms a plurality of ridges on a back surface thereof for facilitating manual operation. The clasps 173 extend from an inner surface of the manipulating section 175.

The pushing device 35 is assembled on the front end of data storage device 30. A pair of pushing portions 353 is formed on two ends of the main body 351 of the pushing device 35 respectively. Each pushing portion 353 includes a resilient element 354. The resilient elements 354 are coil springs in this preferred embodiment. A pair of fixing tabs 357, 358 is formed on the main body 351 of the pushing device 35, and the fixing tabs 357, 358 are adjacent to the pushing portions 353 respectively. Each fixing tab 357, 358 defines a pair of through holes 359. Each side wall 33 of the data storage device 30 defines a pair of threaded holes 331. Two pairs of screws 37 extend through the through holes 359 then engage in the threaded holes 331 respectively, thus the pushing device 35 is mounted to the side walls 33 of the data storage device 30. The main body 351 of the pushing device 35 is keep close to a lower surface of the data storage device 30.

Figure 2:
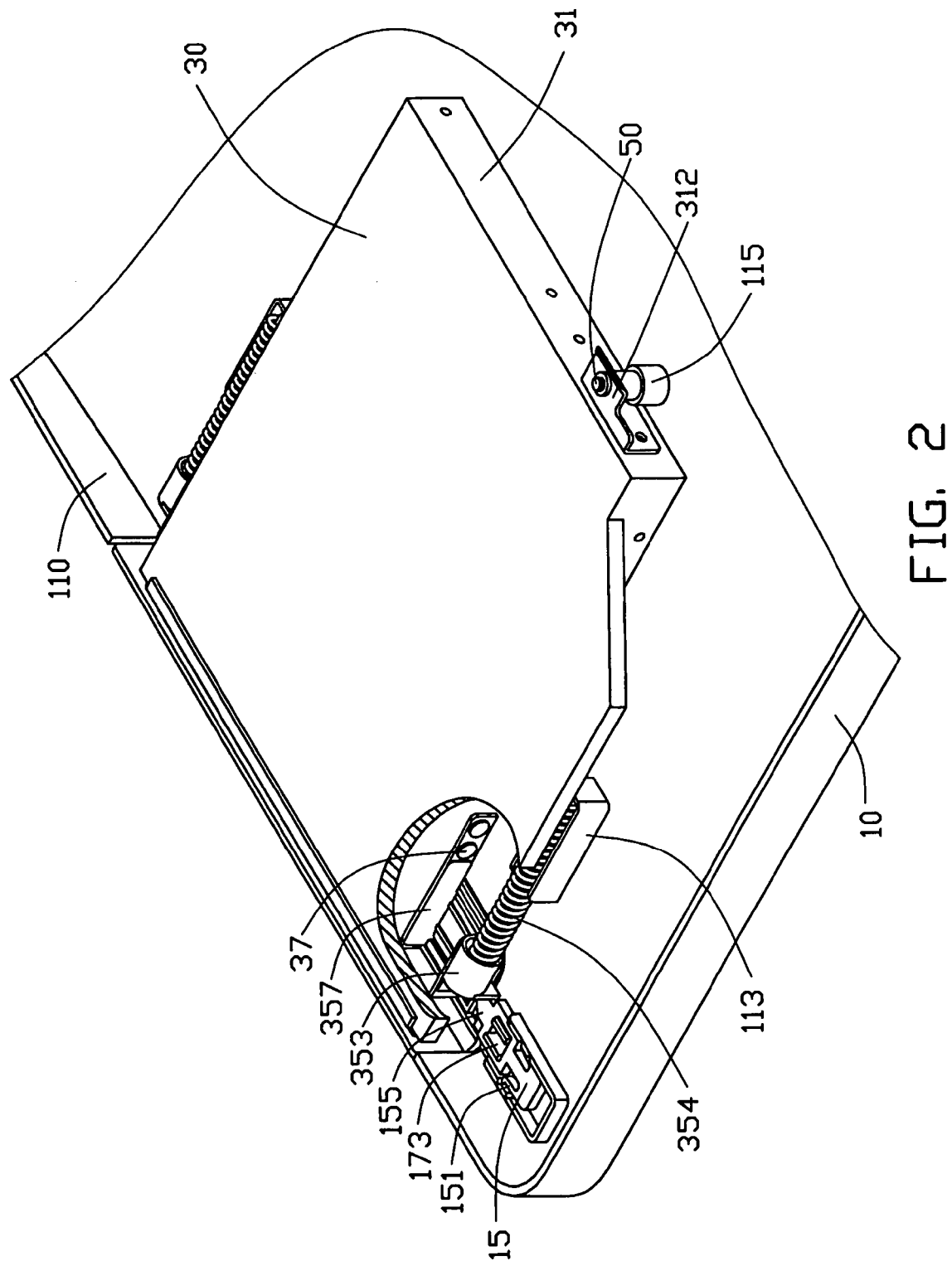
FIG. 2 is an assembled view of FIG. 1, showing the data storage device being locked.
Figure 3:
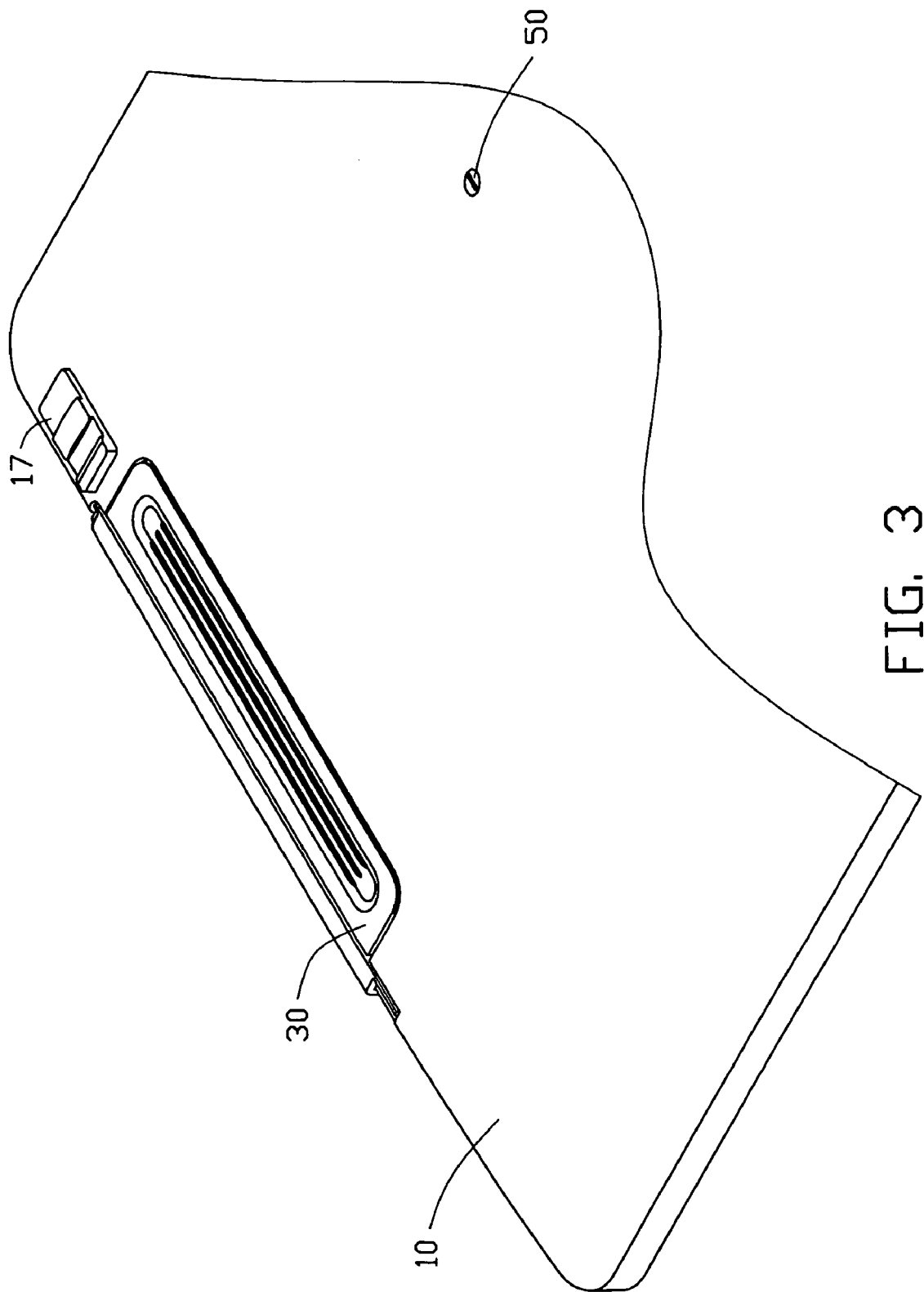
FIG. 3 is an inverted view of FIG. 2.

Referring also to FIGS. 2 and 3, in assembling the pushing assembly, the clasps 173 extend through the sliding slot 135 and the aperture 153, and engage with the edges of the aperture 153. Thus, the operation portion 17 is arranged in an outer side of the bottom panel 11, and the stopping member 15 can slide with the operation portion 17 along the sliding slot 135. The latches 152 of the stopping member 15 are locked into the first cutouts 131 of the restricting portion 13. The data storage device 30 is pushed into the notebook computer enclosure 10 from the opening 111. The blocks 116 are received in the free ends of the resilient elements 354. The free ends of the resilient elements 354 press against the inner bottom of the receiving portions 113, and the resilient elements 354 are compressed. The connector of the data storage device 30 connects with a connector of a motherboard in the notebook computer enclosure 10. The manipulating section 175 of the operation portion 17 is pushed to slide the operation portion 17, and the stopping member 15 is driven by the operation portion 17 to slide along the sliding slot 135. The stopping member 15 slides along a direction approaching to the data storage device 30, and the latches 152 of the stopping member 15 are locked into the second cutouts 133 of the restricting portion 13. The stopping plane 157 of the stopping member 15 presses against a front end of the pushing portion 353 to prevent the data storage device 30 being pushed out of the notebook computer enclosure 10. The screw 50 extends through the round hole 115 of the positioning post 114 then engages in the securing hole 313 of the fixing portion 311, thus the data storage device 30 is attached to the notebook computer enclosure 10.

Figure 4:
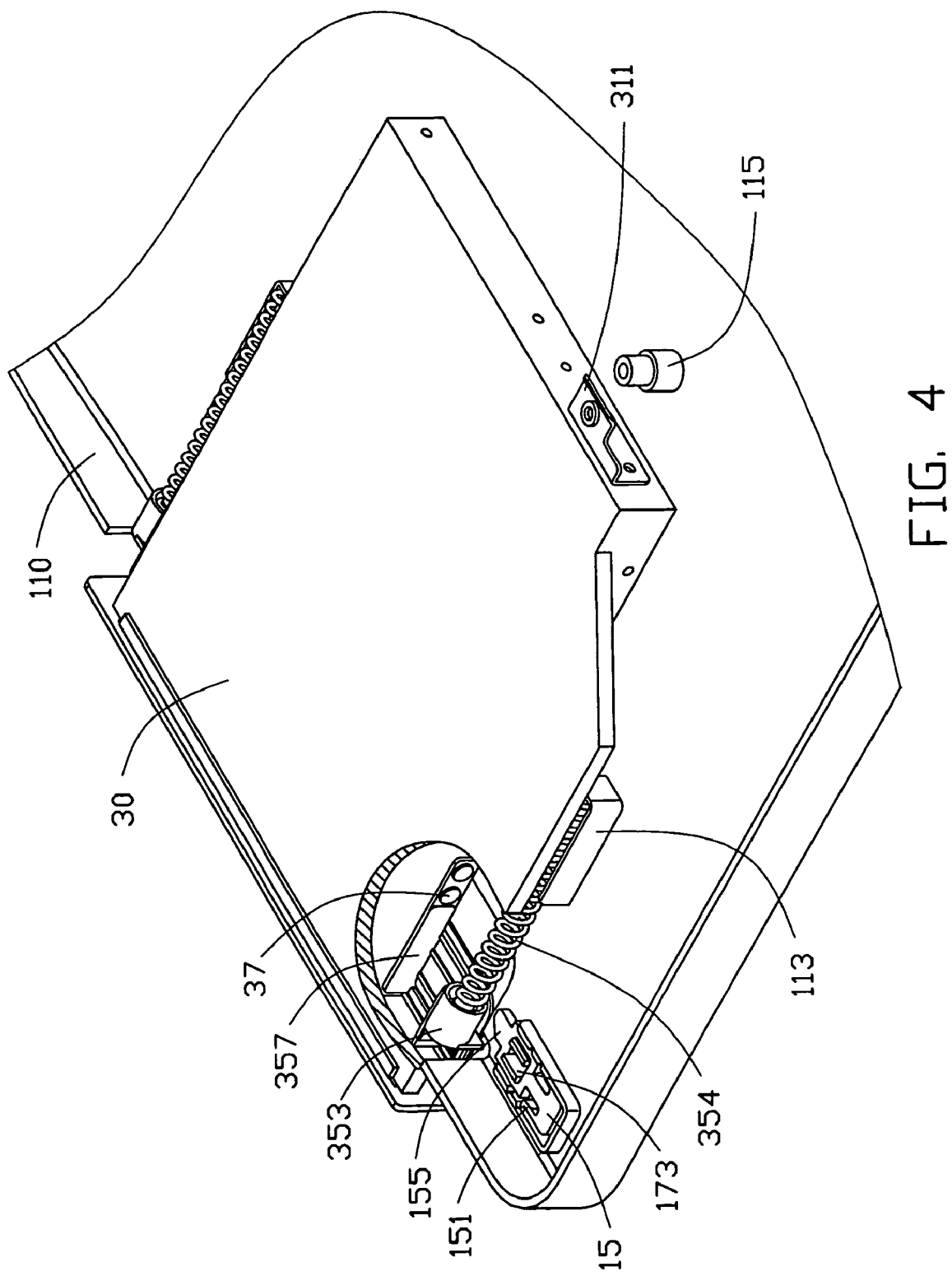
FIG. 4 is an assembled view of FIG. 1, showing the data storage device being pushed out.

Referring also to FIG. 4, in detaching the data storage device 30, the screw 50 is unscrewed from the securing hole 313 of the fixing portion 311. The manipulating section 175 of the operation portion 17 is pushed to slide the operation portion 17, and the stopping member 15 is driven by the operation portion 17 to slide along the sliding slot 135. The latches 152 of the stopping member 15 are locked into the first cutouts 131 of the restricting portion 13. The restoring force of resilient elements 354 pushes the pushing device 35 to move forward, and the pushing device 35 drives the data storage device 30 forward. Therefore, the connector of the data storage device 30 is pulled out and the data storage device 30 is pulled out a certain distance to facilitate being taken out from the notebook computer enclosure 10. The data storage device 30 is taken out from the notebook computer enclosure 10 by pulling the main body 351 of the pushing device 35.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments.

We claim:

1. A pushing assembly for pushing a data storage device out of a computer enclosure, the pushing assembly comprising:
   a pair of receiving portions and a restricting portion immovably arranged in the computer enclosure;
   a pushing device assembled on the data storage device, the pushing device comprising a pair of pushing portions, each of the pushing portions comprising a resilient element, the resilient elements pressing against the receiving portions respectively and pushing the pushing device to move outward from the computer enclosure, and the pushing device driving the data storage device to slide a certain distance to facilitate the data storage device being taken out from the computer enclosure; and
   a stopping member arranged in the restricting portion to keep the pushing device at a locked state.

2. The pushing assembly as claimed in claim 1, wherein a stopping block protrudes from an end of the stopping member, and the stopping block press against an end of one of the pushing portions to prevent the data storage device being pushed out of the computer enclosure.

3. The pushing assembly as claimed in claim 1, wherein the resilient elements are coil springs received in the receiving portions, and two blocks are formed on an inner bottom of the receiving portions respectively, and the blocks are received in free ends of the coil springs.

4. The pushing assembly as claimed in claim 1, further comprising an operation portion, the operation portion is attached to the stopping member and drives the stopping member to slide along the restricting portion.

5. The pushing assembly as claimed in claim 4, wherein the operation portion comprises a pair of clasps, the restricting portion comprises a sliding slot defined in the computer enclosure, the stopping member comprises an aperture, the clasps extend through the sliding slot and the aperture, and engage with edges of the aperture, thus the stopping member slides with the operation portion along the sliding slot.

6. The pushing assembly as claimed in claim 5, wherein restricting portion forms a pair of first cutouts and a pair of second cutouts, the stopping member a pair of fastening feet, each of the feet forms a latch, and the latches lock into the first cutouts or the second cutouts to keep the stopping member in an unlocked state or a locked state.

7. The pushing assembly as claimed in claim 5, wherein the operation portion comprises a manipulating section, the clasps extend from an inner surface of the manipulating section, and the manipulating section forms a plurality of ridges on a back surface thereof for facilitating manual operation portion.

8. The pushing assembly as claimed in claim 1, wherein a pair of fixing tabs is formed on the pushing device, each of the fixing tabs defines a pair of through holes, two pairs of threaded holes are defined in two side walls of the data storage device, and two pairs of screws extend through the through holes of the fixing tabs then engage in the threaded holes respectively, thus the pushing device is mounted to the of the data storage device.

9. The pushing assembly as claimed in claim 1, wherein the computer enclosure comprises a side panel, an opening is defined in the side panel for entry of the data storage device.

10. A pushing assembly for pushing an electronic component out of an enclosure of an electronic device without opening the enclosure, the pushing assembly comprising:
    a pair of receiving portions and a restricting portion arranged in an inner side of the enclosure;
    a pushing device assembled on the electronic component and pressing against the receiving portions, and the pushing device driving the electronic component to slide a certain distance to facilitate the electronic component being taken out from the enclosure;
    a stopping member arranged in the restricting portion to lock the pushing device at a certain state; and
    an operation portion attached to the stopping member and arranged in an outer side of the enclosure, and the operation portion driving the stopping member to slide along the restricting portion.

11. The pushing assembly as claimed in claim 10, wherein the pushing device comprises a pair of pushing portions, each of the pushing portions includes a resilient element, the resilient elements are received in and press against the receiving portions respectively.

12. The pushing assembly as claimed in claim 11, wherein a stopping block protrudes from an end of the stopping member, and the stopping block press against an end of one of the pushing portions to prevent the electronic component being pushed out of the enclosure.

13. The pushing assembly as claimed in claim 10, wherein the operation portion comprises a pair of clasps, the restricting portion comprises a sliding slot defined in the enclosure, the stopping member comprises an aperture, the clasps extend through the sliding slot and the aperture, and engage with edges of the aperture, thus the stopping member slides with the operation portion along the sliding slot.

14. The pushing assembly as claimed in claim 13, wherein restricting portion forms a pair of first cutouts and a pair of second cutouts, the stopping member a pair of fastening feet, each of the feet forms a latch, and the latches lock into the first cutouts or the second cutouts to keep the stopping member in an unlocked state or a locked state.

15. The pushing assembly as claimed in claim 10, wherein a pair of fixing tabs is formed on the pushing device, each of the fixing tabs defines a pair of through holes, two pairs of threaded holes are defined in two side walls of the electronic component, and two pairs of screws extend through the through holes of the fixing tabs then engage in the threaded holes respectively, thus the pushing device is mounted to the of the electronic component.

16. An electronic device comprising:
an enclosure of said electronic device enclosing said electronic device and defining a space therein, an opening defined at said enclosure beside said space to spatially communicate said space with an outside of said electronic device; and
an electronic component of said electronic device removably installable in said space of said enclosure to function for said electronic device, said electronic component comprising a pushing device attachable thereto, said pushing device constantly applying forces on said electronic component to eject said electronic component out of said space to said outside of said electronic device through said opening when said electronic component completely resides in said space, wherein said pushing device comprises a main body attachable to an end of said electronic component which is located beside said opening when said electronic component completely resides in said space, and a pair of pushing portions formed from two opposite ends of said main body respectively to extend along two corresponding opposite sides of said electronic component and apply said forces for said pushing device to eject said electronic component out of said space.

17. The electronic device as claimed in claim 16, further comprising a stopping member formed in said enclosure beside space in order to interferingly engage with said pushing device and position said electronic component in said space when said electronic component completely resides in said space.

18. The electronic device as claimed in claim 16, wherein said pushing device comprises two resilient elements respectively received in corresponding receiving portions integrally formed at said enclosure and compressible between said receiving portions and said electronic component to apply said forces.

19. The electronic device as claimed in claim 18, wherein said resilient elements are coil springs, and two blocks are formed on an inner bottom of said receiving portions respectively, free ends of said coil springs are fixed to said two blocks respectively.

* * * * *

UNITED STATES PATENT AND TRADEMARK OFFICE
CERTIFICATE OF CORRECTION

PATENT NO. : 7,589,961 B2
APPLICATION NO. : 11/472978
DATED : September 15, 2009
INVENTOR(S) : Jiang et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 480 days.

Signed and Sealed this

Twenty-first Day of September, 2010

David J. Kappos
*Director of the United States Patent and Trademark Office*